(12) United States Patent
Yamada et al.

(10) Patent No.: US 9,594,406 B2
(45) Date of Patent: Mar. 14, 2017

(54) TOUCH PANEL AND METHOD FOR PRODUCING SAME

(71) Applicant: GUNZE LIMITED, Kyoto (JP)

(72) Inventors: Tsutomu Yamada, Kyoto (JP); Masaya Nakagoshi, Kyoto (JP); Kousuke Nakajima, Kyoto (JP)

(73) Assignee: GUNZE LIMITED, Kyoto (JP)

( * ) Notice: Subject to any disclaimer, the term of this patent is extended or adjusted under 35 U.S.C. 154(b) by 0 days.

(21) Appl. No.: 14/358,244

(22) PCT Filed: Nov. 9, 2012

(86) PCT No.: PCT/JP2012/079086
§ 371 (c)(1),
(2) Date: Aug. 5, 2014

(87) PCT Pub. No.: WO2013/073460
PCT Pub. Date: May 23, 2013

(65) Prior Publication Data
US 2014/0347578 A1    Nov. 27, 2014

(30) Foreign Application Priority Data
Nov. 17, 2011   (JP) .................................. 2011-251430

(51) Int. Cl.
*G06F 3/041* (2006.01)
*G02F 1/1335* (2006.01)
(Continued)

(52) U.S. Cl.
CPC .............. *G06F 1/169* (2013.01); *B29C 65/48* (2013.01); *G06F 3/044* (2013.01); *G06F 3/0412* (2013.01);
(Continued)

(58) Field of Classification Search
CPC ........ G06F 3/044; G06F 3/0412; G06F 1/169; G06F 2203/04103; B29C 65/48
(Continued)

(56) References Cited

U.S. PATENT DOCUMENTS 3,849,693 A * 11/1974 Kuchinski et al. ... H01J 17/491
                                                       313/519
6,563,435 B1 * 5/2003 Platz .................... H01H 13/702
                                                       200/5 A
(Continued)

FOREIGN PATENT DOCUMENTS

JP    H10-312244 A    11/1998
JP    2001-034418 A    2/2001
(Continued)

OTHER PUBLICATIONS

International Search Report; PCT/JP2012/079086; Feb. 12, 2013.

*Primary Examiner* — Prabodh M Dharia
(74) *Attorney, Agent, or Firm* — Studebaker & Brackett PC

(57) ABSTRACT

A touch panel includes a first planar body having a first electrode patterned on one surface of a first substrate and a first lead-out wiring electrically connected to the first electrode, a cover sheet, a second planar body provided between the first planar body and the cover sheet except a predetermined region of a side edge of the first substrate, and a flexible wiring board interposed at a gap portion formed between the predetermined region of the side edge of the first substrate and the cover sheet, wherein the flexible wiring board includes a connector portion fixed onto the connection terminal of the first lead-out wiring held by the first planar body and electrically connected with the first lead-out wiring, and a spacer member that abuts with both
(Continued)

the connector portion and the cover sheet is disposed between the connector portion and the cover sheet.

6 Claims, 6 Drawing Sheets

(51) Int. Cl.
    *G06F 1/16*           (2006.01)
    *G06F 3/044*         (2006.01)
    *B29C 65/48*         (2006.01)

(52) U.S. Cl.
    CPC ............ *G06F 2203/04103* (2013.01); *Y10T 156/1089* (2015.01)

(58) Field of Classification Search
    USPC ........ 345/156–184, 690; 349/12, 40, 38, 58, 349/166; 178/18.01–18.06; 156/297
    See application file for complete search history.

(56) References Cited

U.S. PATENT DOCUMENTS

| | | | | |
|---|---|---|---|---|
| 6,570,707 | B1 * | 5/2003 | Murakami | G06F 3/045 250/225 |
| 6,572,941 | B1 | 6/2003 | Murakami et al. | |
| 6,587,097 | B1 * | 7/2003 | Aufderheide | G06F 3/045 345/104 |
| 6,707,450 | B2 * | 3/2004 | Ahn | G02F 1/13338 178/18.01 |
| 6,933,064 | B2 * | 8/2005 | Anderson | B32B 7/02 345/173 |
| 7,163,733 | B2 * | 1/2007 | Bourdelais | B32B 3/12 200/512 |
| 7,427,441 | B2 * | 9/2008 | Majumdar | G02F 1/13439 156/230 |
| 7,494,358 | B2 * | 2/2009 | Fujii | G06F 3/0416 349/58 |
| 7,499,038 | B2 * | 3/2009 | Nishikawa | G06F 3/045 345/173 |
| 9,028,123 | B2 * | 5/2015 | Nichol | G02B 6/0076 349/63 |
| 2004/0070572 | A1 | 4/2004 | Nakajima | |
| 2006/0017707 | A1 * | 1/2006 | Fukui | G06F 3/045 345/173 |
| 2006/0274049 | A1 * | 12/2006 | Spath | B82Y 10/00 345/173 |
| 2007/0181456 | A1 | 8/2007 | Kusuda et al. | |
| 2008/0007518 | A1 * | 1/2008 | Majumdar | C09D 5/24 345/156 |
| 2008/0079864 | A1 * | 4/2008 | Nishimura | G02F 1/13452 349/58 |
| 2008/0246741 | A1 * | 10/2008 | Hinata | G06F 3/045 345/173 |
| 2008/0271933 | A1 * | 11/2008 | Morimoto | A61B 5/447 178/18.05 |
| 2010/0079694 | A1 * | 4/2010 | Yoshida | G02F 1/134363 349/40 |
| 2010/0118243 | A1 * | 5/2010 | Majumdar | H01L 51/0021 349/122 |
| 2010/0201719 | A1 * | 8/2010 | Kimura | G06T 1/00 345/690 |
| 2011/0227842 | A1 * | 9/2011 | Lin | G06F 3/044 345/173 |
| 2012/0249465 | A1 * | 10/2012 | Lin | G06F 3/041 345/173 |
| 2014/0225867 | A1 * | 8/2014 | Schimanski | G06F 3/044 345/174 |
| 2014/0300837 | A1 * | 10/2014 | Gates | G06F 3/0412 349/12 |
| 2016/0026250 | A1 * | 1/2016 | Eriksson | G06F 3/0421 345/175 |

FOREIGN PATENT DOCUMENTS

| | | |
|---|---|---|
| JP | 2002-175155 A | 6/2002 |
| JP | 2004-133767 A | 4/2004 |
| JP | 2007-018021 A | 1/2007 |
| JP | 2011-118657 A | 6/2011 |
| JP | 2011-170508 A | 9/2011 |
| JP | 2011-192567 A | 9/2011 |
| WO | 2005/064451 A1 | 7/2005 |

\* cited by examiner

PRIOR ART

PRIOR ART

TOUCH PANEL AND METHOD FOR PRODUCING SAME

TECHNICAL FIELD

The present invention relates to a touch panel and a method for manufacturing the same.

BACKGROUND ART

Conventionally, a configuration of a touch panel for detecting an input position has been examined variously. For example, a touch panel has a structure obtained by superimposing transparent planar bodies 101 and 102 as respectively illustrated in FIGS. 6(a) and 6(b). The transparent planar body 101 includes a transparent substrate 103, a transparent electrode 105 formed on one surface of this transparent substrate 103 and having a predetermined pattern shape, and a lead-out wiring 107 extending such that one end is connected to each electrode portion 105a constituting the transparent electrode 105 and the other end is disposed at a side edge of the substrate 103. The transparent planar body 102 includes a transparent substrate 104, a transparent electrode 106 formed on one surface of this transparent substrate 104 and having a predetermined pattern shape, and a lead-out wiring 108 extending such that one end is connected to each electrode portion 106a constituting the transparent electrode 106 and the other end is disposed at a side edge of the substrate 104. The other ends of the plurality of lead-out wirings 107 and 108 are collectively disposed at predetermined places of the side edges of the respective transparent substrates 103 and 104. Further, a notch portion 109 is formed at a side edge of the transparent planar body 102, of the superimposed transparent planar bodies 101 and 102, disposed on an upper side (a touch surface side). This notch portion 109 is for forming a space part for disposing a connector portion of a flexible wiring board, which is connected to the other end of the lead-out wiring 107 held by the transparent planar body 101 disposed on a lower side and which guides a touch signal (an input signal) to an external circuit for touch position determination. As illustrated in FIG. 7, when the respective transparent planar bodies are superimposed, the notch portion 109 is formed so as to expose a region, in which the other end of the lead-out wiring 107 held by the lower side transparent planar body is disposed.

As illustrated in a sectional view of a schematic configuration of FIG. 8, a cover sheet 110 having a function as a surface protection layer is provided on a surface of such a touch panel. The touch panel is used by being provided on a display device 111 of a game machine, a ticket vending machine, a conference table, a bank terminal (cash dispenser), a personal computer, an electronic notebook, a PDA, a cell phone, or the like. It should be noted that a flexible wiring board 112 is usually bent to the display device 111 side and connected to a circuit for touch position determination.

SUMMARY OF THE INVENTION

Problems to be Solved by the Invention

However, in the aforementioned connection structure of the flexible wiring board, in a case where the flexible wiring board is bent and connected to the external circuit for touch position determination, along with bending of the flexible wiring board, a force that peels the connector portion from a connection terminal is generated at a connecting place between the connector portion of the flexible wiring board and the lead-out wiring in the transparent planar body disposed on the lower side. Thus, there has been a problem in that the flexible wiring board fixed onto the lead-out wiring is easily peeled therefrom. In such a case, it becomes difficult to maintain a stable conduction state between the flexible wiring board and the lead-out wiring, and it becomes difficult to detect the touch position.

The present invention has been made to solve such problems, and an object thereof is to provide a touch panel in which a flexible wiring board fixed onto a lead-out wiring is difficult to be peeled therefrom, and a method for manufacturing the same.

Means for Solving the Problems

The object of the present invention is achieved by a touch panel including: a first planar body having a first electrode patterned on one surface of a first substrate and a first lead-out wiring electrically connected to the first electrode; a cover sheet provided on one surface side of the first planar body; a second planar body provided between the first planar body and the cover sheet except a predetermined region of a side edge of the first substrate, the predetermined region in which one end portion of the first lead-out wiring serving as a connection terminal is disposed; and a flexible wiring board interposed at a gap portion formed between the predetermined region of the side edge of the first substrate and the cover sheet, and drawn outside from a side of the first planar body and the cover sheet, wherein the flexible wiring board includes a connector portion fixed onto the connection terminal of the first lead-out wiring held by the first planar body and electrically connected with the first lead-out wiring, and a spacer member that abuts with both the connector portion and the cover sheet is disposed between the connector portion and the cover sheet.

In this way, the spacer member that abuts with both the connector portion of the flexible wiring board and the cover sheet is disposed at the gap portion formed between the connector portion and the cover sheet. In this case, along with bending of the flexible wiring board, even if a force that peels the connector portion from the connection terminal is generated at a connecting place between the connector portion of the flexible wiring board and the connection terminal of the lead-out wiring, the cover sheet is capable of receiving this force through the spacer member. Consequently, the connector portion of the flexible wiring board can be effectively prevented from being peeled from the connection terminal of the lead-out wiring. As a result, it is possible to maintain a stable conduction state between the flexible wiring board and the lead-out wiring.

Further, in the touch panel, the spacer member is preferably a film body disposed on the connector portion. Alternatively, the spacer member is preferably formed of a general film material, a general resin adhesive material, or an ultraviolet curing adhesive material.

Further, a width of the spacer member is preferably formed larger than a width of the connector portion of the flexible wiring board in a plan view.

In this way, in the plan view of the touch panel, by forming the width of the spacer member larger than that of the connector portion of the flexible wiring board, it is possible to easily determine an outline of the spacer member even in a state in which the spacer member is laminated on the flexible wiring board. Accordingly, at the time of inspection work in a manufacturing stage of the touch panel, it is possible to easily determine whether or not the spacer member is disposed.

Further, the spacer member is preferably disposed by being fixed to any one of the cover sheet and the connector portion. The connector portion of the flexible wiring board, the spacer member, the cover sheet, and the like are slightly expand and contract repeatedly due to the influence of heat and humidity. However, by having a configuration in which the spacer member and the cover sheet are fixed to each other and the spacer member and the connector portion are not fixed to each other, or a configuration in which the spacer member and the connector portion are fixed to each other and the spacer member and the cover sheet are not fixed to each other, strain due to expansion or contraction of the connector portion, the spacer member, or the like generated at the connecting place between the connector portion and the connection terminal of the lead-out wiring can be reduced, and the connector portion can be more effectively prevented from being peeled from the connection terminal of the lead-out wiring.

Further, the object of the present invention is achieved by a method for manufacturing a touch panel including: a planar body adhering step of adhering a first planar body, which has a first electrode patterned on one surface of a first substrate and a first lead-out wiring electrically connected to the first electrode, and a second planar body with an adhesive layer therebetween in a state of exposing a predetermined region of a side edge of the first substrate, the predetermined region in which one end portion of the first lead-out wiring serving as a connection terminal is disposed; a flexible wiring board connecting step of connecting a connector portion of a flexible wiring board onto the connection terminal of the first lead-out wiring held by the first planar body; a spacer adhering step of laminating and adhering a spacer member on an upper side of the connector portion connected onto the connection terminal of the first lead-out wiring; and a cover sheet adhering step of laminating and adhering a cover sheet on an upper side of the second planar body and the spacer member, after interposing an adhesive layer on an exposed surface of the second planar body.

Effects of the Invention

According to the present invention, it is possible to provide a touch panel in which a flexible wiring board fixed onto a lead-out wiring is difficult to be peeled therefrom, and a method for manufacturing the same.

EMBODIMENTS OF THE INVENTION

Figure 1:
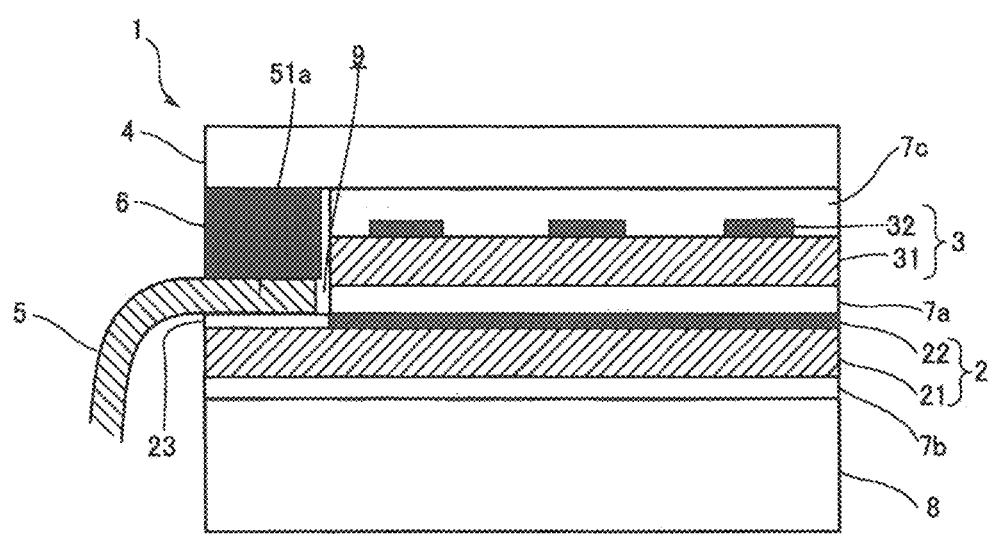
FIG. 1 is a sectional view of a schematic configuration of a touch panel according to an embodiment of the present invention.

A touch panel according to an embodiment of the present invention will be described below with reference to the accompanying drawings. For easy understanding of the configuration, each of the drawings is not shown in an actual size ratio but is partially enlarged or reduced. The touch panel according to an embodiment of the present invention, for example, is an electrostatic capacitance type touch panel used by being mounted to, for example, a display device of a bank terminal (cash dispenser), a ticket vending machine, a personal computer, OA equipment, an electronic notebook, a PDA, a cell phone, or the like. As illustrated in a sectional view of a schematic configuration of FIG. 1, the touch panel includes a first planar body 2, a second planar body 3, a cover sheet 4, a flexible wiring board 5, and a spacer member 6.

Figure 2A:
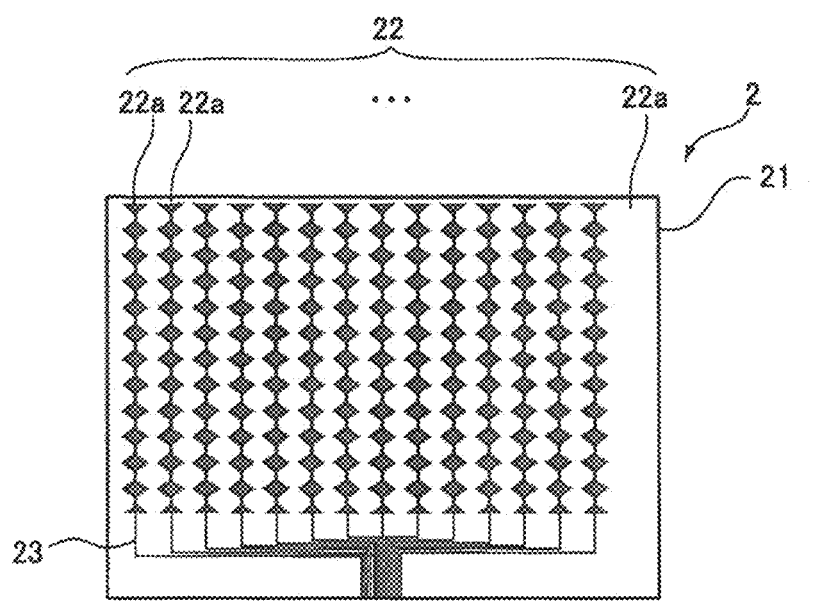
FIGS. 2(a) and 2(b) are plan views of a first planar body and a second planar body included in the touch panel illustrated in FIG. 1.

As illustrated in the sectional view of FIG. 1 and a plan view of FIG. 2(a), the first planar body 2 includes a first substrate 21, a first electrode 22 patterned on one surface of the first substrate 21, a first lead-out wiring 23 electrically connected to each electrode portion 22a constituting the first electrode 22. Similarly, as illustrated in the sectional view of FIG. 1 and a plan view of FIG. 2(b), the second planar body 3 includes a second substrate 31, a second electrode 32 patterned on one surface of the second substrate 31, a second lead-out wiring 33 electrically connected to each electrode portion 32a constituting the second electrode 32. As illustrated in FIG. 1, the first planar body 2 is adhered to the second planar body 3 with an adhesive layer 7a therebetween, such that the first electrode 22 and the other surface side (the side of the surface on which the second electrode 32 is not formed) of the second substrate 31 are spaced apart and opposed to each other. The first planar body 2 may be adhered to the second planar body 3 with the adhesive layer 7a therebetween, such that the first electrode 22 and the second electrode 32 are spaced apart and opposed to each other. Alternatively, the first planar body 2 may be adhered to the second planar body 3 with the adhesive layer 7a therebetween, such that the other surface of the first substrate 21 and the second electrode 32 are spaced apart and opposed to each other. Further, when a touch panel 1 is mounted to a display device of a bank terminal, a ticket bending machine, or the like, the touch panel 1 is mounted to a display device 8 with an adhesive layer 7b therebetween, so that the second planar body 3 is on a touch surface side and the first planar body 2 is on a side close to the display device. A general transparent adhesive such as an epoxy-based or acrylic adhesive can be used for the adhesive layers 7a and 7b, and an adhesive containing a core material formed of a transparent film of polyester-based resin may be used therefor. The adhesive layers 7a and 7b may be formed by superimposing a plurality of sheet-like adhesives, and furthermore, may be formed by superimposing a plurality of kinds of sheet-like adhesives. A thickness of the adhesive layer 7a is not particularly specified, and it is preferable that the thickness thereof be practically from 20 μm to 500 μm. The adhesive layer 7b is not particularly specified, and may be adhered to an entire surface or adhered to a circumference. A thickness of the adhesive layer 7b is not particularly specified, and it is preferable that the thickness thereof be practically from 20 μm to 1500 μm.

The first substrate 21 and the second substrate 31 are preferably dielectric substrates constituting insulating layers and are preferably formed of a material having high transparency. For example, the first substrate 21 and the second substrate 31 are formed of a flexible film made of a synthetic resin, such as polyethylene terephthalate (PET), polyimide (PI), polyethylene naphthalate (PEN), polyether sulfone (PES), polyether ether ketone (PEEK), polycarbonate (PC), polypropylene (PP), polyamide (PA), acryl, an amorphous polyolefin-based resin, a cyclic polyolefin-based resin, aliphatic cyclic polyolefin, or a norbornane-based thermoplastic transparent resin, or a laminate formed by two or more of them. Alternatively, the first substrate 21 and the second substrate 31 are formed of a glass plate such as soda glass, alkali-free glass, borosilicate glass, or quartz glass. Thicknesses of the first substrate 21 and the second substrate 31 are not particularly limited. For example, in a case where the first substrate 21 and the second substrate 31 are formed of the flexible film made of a synthetic resin, the thicknesses are preferably about 10 μm to 2000 μm, and more preferably about 50 μm to 500 μm. Moreover, in a case where the first substrate 21 and the second substrate 31 are formed of the glass plate, the thicknesses are preferably about 0.1 mm to 5 mm.

Further, in a case where the first substrate 21 and the second substrate 31 are formed of the material having flexibility, a support may be adhered to the first substrate 21 and the second substrate 31 to provide rigidity. Examples of the support can include a glass plate or a resin material having hardness equivalent to glass, and a thickness thereof is preferably 100 μm or more, and more preferably from 0.2 mm to 10 mm. It should be noted that a necessary functional film may be added to the surfaces of first substrate 21 and the second substrate 31. For example, plasma processing may be performed for improving wettability, a hard coat layer for protecting a surface or an undercoat layer for improving adhesion with the first electrode 22 and the second electrode 32 or improving optical characteristics may be provided.

A notch portion 31a is formed at a side edge of the second substrate 31 held by the second planar body 3 disposed on the touch surface side. When the respective planar bodies 2 and 3 are superimposed, the notch portion 31a is formed at a position exposing a region, in which the other end of the first lead-out wiring 23 held by the first planar body 2 is disposed.

Figure 2B:
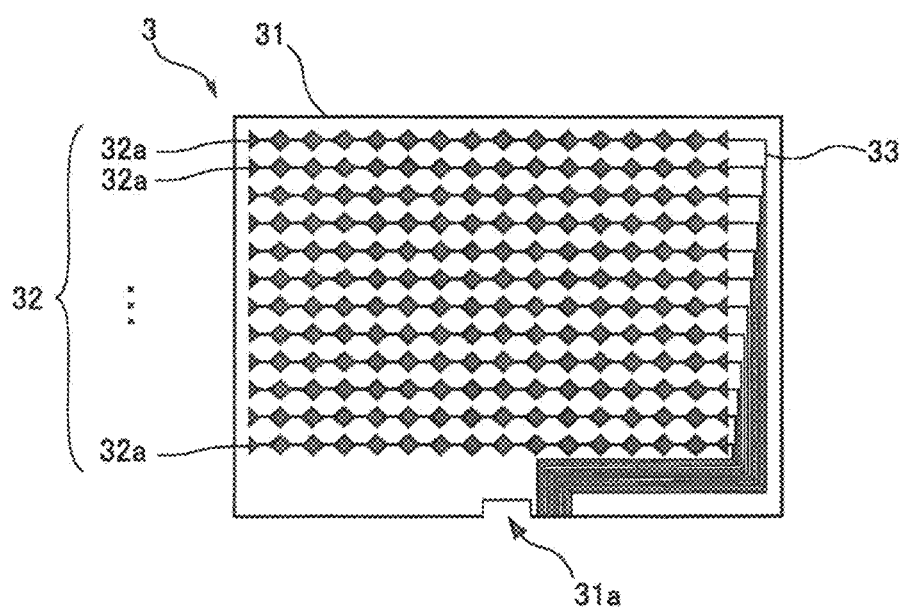
Figure 6A:
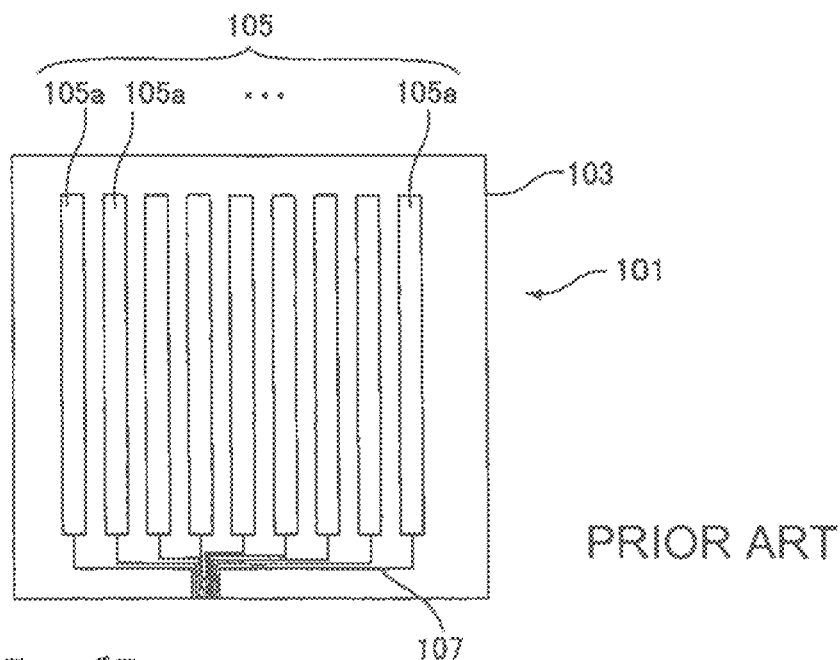
FIGS. 6(a) and 6(b) are explanatory views for describing a configuration of a conventional touch panel.
Figure 6B:
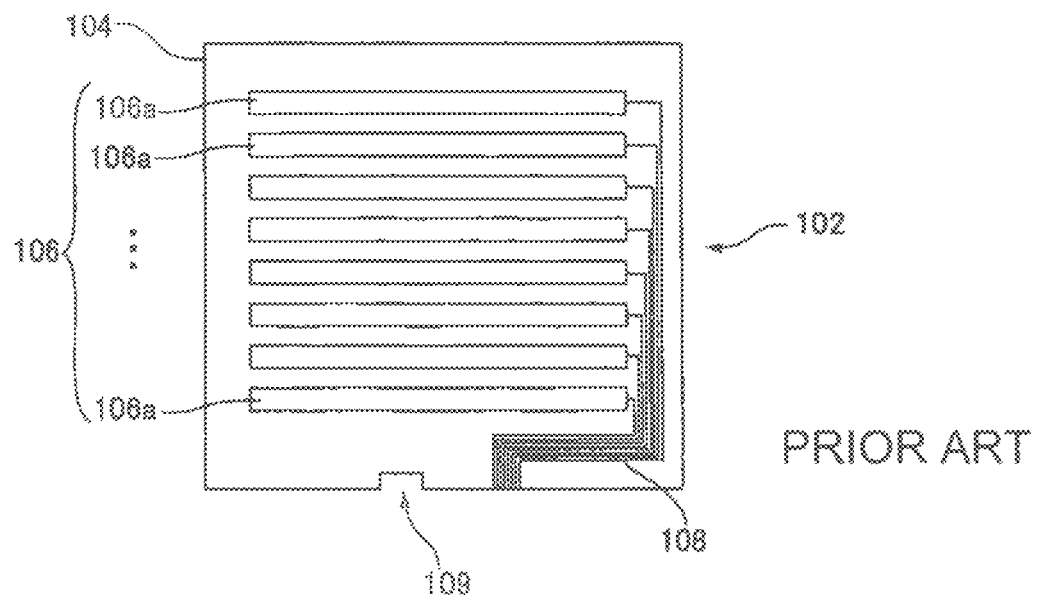
Figure 7:
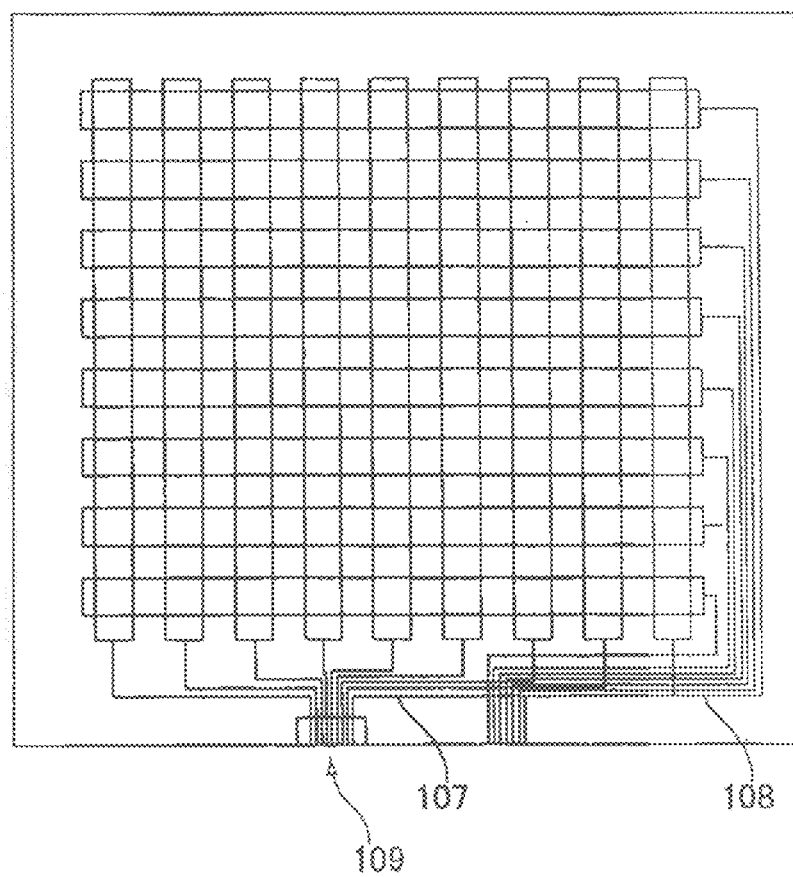
FIG. 7 is a plan view illustrating a state in which planar bodies illustrated in FIGS. 6(a) and 6(b) are superimposed on each other.
Figure 8:
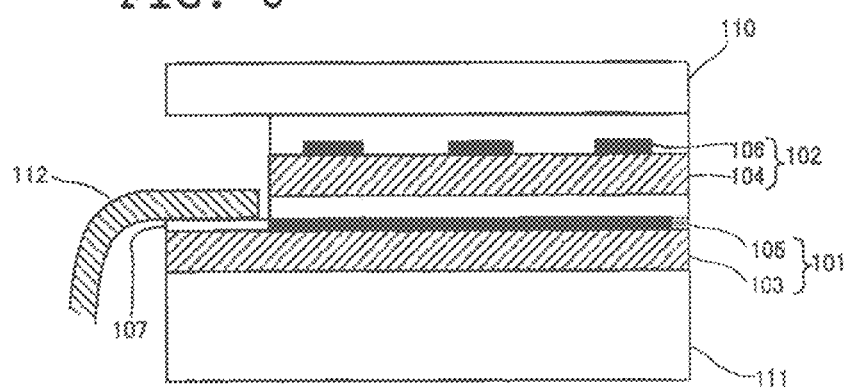
FIG. 8 is a sectional view of a schematic configuration of the conventional touch panel.

As illustrated in FIGS. 2(a) and 2(b), the first electrode 22 and the second electrode 32, which are patterned and respectively formed on one principal surfaces of the first substrate 21 and the second substrate 31, are respectively formed as assemblies of the strip-shaped electrode portions 22a and 32a formed at predetermined intervals so as to extend parallel to each other. The strip-shaped electrode portions 22a and 32a constituting the first electrode 22 and the second electrode 32 have configurations, in which a plurality of rhombus-shaped electrode bodies is linearly coupled. The electrode portions 22a and 32a are arranged such that coupling directions of the rhombus-shaped electrode portions in the first electrodes 22 and the second electrodes 32 are orthogonal to each other and the upper and lower rhombus-shaped electrode portions are not superimposed in a plan view. The pattern shapes of the first electrode 22 and the second electrode 32 are not limited to those of the present embodiment, and any shape can be employed as long as a contact point, such as a finger, is detectable. For example, as illustrated in FIGS. 6(a) and 6(b), the shapes of the strip-shaped electrode portions 22a and 32a can be rectangular. However, regarding operation performance such as resolution of the touch panel 1, a configuration adopted by reducing a region where electrode portions 22a and 32a do not exist is superior in the case where the first planar body 2 and the second planar body 3 are superimposed. From such a viewpoint, as the pattern shapes of the first electrode 22 and the second electrode 32, the configuration in which the plurality of rhombus-shaped electrode portions is linearly coupled is more desirable than the rectangular configuration. However, the configuration is not limited to that of the present embodiment, and an appropriate pattern shape can be selected.

Examples of materials of the first electrode 22 and the second electrode 32 can include a transparent conductive material such as indium tin oxide (ITO), indium oxide, antimony-doped tin oxide, fluorine-doped tin oxide, aluminum-doped zinc oxide, potassium-doped zinc oxide, silicon-doped zinc oxide, a zinc oxide-tin oxide-based material, an indium oxide-tin oxide-based material, a zinc oxide-indium oxide-magnesium oxide-based material, zinc oxide, or a tin oxide film, or alternatively, a metallic material such as tin, copper, aluminum, nickel, or chromium, and a metal oxide material. The first electrode 22 and the second electrode 32 may be formed by combining two or more of them. Further, even a metal simple substance, which is vulnerable to acid or alkali, can be used as a conductive material.

Moreover, it is also possible to use, as the materials of the first electrode 22 and the second electrode 32, a composite material obtained by dispersing, in a polymeric material functioning as a binder, an extra fine conductive carbon fiber such as a carbon nanotube, a carbon nanohorn, a carbon nanowire, a carbon nanofiber, or a graphite fibril, or an extra fine conductive fiber formed of a silver material. Here, it is possible to adopt, as the polymeric material, a conductive polymer such as polyaniline, polypyrrole, polyacetylene, polythiophene, polyphenylene vinylene, polyphenylene sulfide, polyp-phenylene, polyheterocycle vinylene, or PEDOT: poly(3,4-ethylenedioxythiophene). Further, it is possible to adopt a non-conductive polymer such as polyethylene terephthalate (PET), polyethylene naphthalate (PEN), polyether sulfone (PES), polyether ether ketone (PEEK), polycarbonate (PC), polypropylene (PP), polyamide (PA), acryl, polyimide, an epoxy resin, a phenol resin, aliphatic cyclic polyolefin, or a norbornane-based thermoplastic transparent resin.

Particularly, in the case where the carbon nanotube composite material obtained by dispersing the carbon nanotube in the non-conductive polymeric material is adopted as the materials of the first electrode 22 and the second electrode 32, the carbon nanotube is extremely fine and has a diameter of 0.8 nm to 1.4 nm (about 1 nm) in general. Accordingly, by dispersing the carbon nanotube in the non-conductive polymeric material one by one or every one bundle, the carbon nanotube hardly blocks light transmission and is preferable in securing transparency of a transparent conductive film.

Examples of a method for forming the first electrode 22 and the second electrode 32 can include a PVD method such as a sputtering method, a vacuum evaporation method, or an ion plating method, a CVD method, a coating method, a printing method, and the like. Further, for example, in a case where the ITO film is formed by the sputtering method, thicknesses of the first electrode 22 and the second electrode 32 are preferably 60 nm or less, and more preferably 30 nm or less. If the film thickness is 5 nm or less, it is difficult to form a continuous film and it is difficult to form a stable conductive layer.

Patterning of the first electrode 22 and the second electrode 32 can be performed by forming mask portions having desirable pattern shapes on surfaces of the ITO films or the like formed on the first substrate 21 and the second substrate 31, removing exposed portions by etching with acid solution or the like, and then dissolving the mask portions by alkali solution or the like.

The first lead-out wiring 23 electrically connected to each strip-shaped electrode portion 22a in the first electrode 22 and the second lead-out wiring 33 electrically connected to each strip-shaped electrode portion 32a in the second electrode 32 are for guiding touch signals detected by the first electrode 22 and the second electrode 32 to a circuit for touch position determination (not illustrated) disposed outside. As illustrated in FIGS. 2(a) and 2(b), one end of each first lead-out wiring 23 is connected to each strip-shaped electrode portion 22a, and the other end thereof is disposed at a side edge of the first substrate 21. Similarly, one end of each second lead-out wiring 33 is connected to each strip-shaped electrode portion 32a, and the other end thereof is disposed at the side edge of the second substrate 31. Further, the one end portions of the first lead-out wiring 23 and the second lead-out wiring 33, which are respectively disposed at the side edges of the first substrate 21 and the second substrate 31, are arranged at predetermined intervals and collectively disposed. The one end portions of the first lead-out wiring 23 and the second lead-out wiring 33, which are collectively arranged, constitute connection terminals, and the flexible wiring board 5 is connected to the connection terminals. When the first planar body 2 and the second planar body 3 are superimposed, the one end portion of the first lead-out wiring 23 constituting the connection terminal is disposed at a position corresponding to the notch portion 31a formed at the second substrate 31 in the second planar body 3.

A method of forming the first lead-out wiring 23 and the second lead-out wiring 33 can include (A) a method of screen printing a conductive paste containing metal conductive particles, such as silver, on the first and second substrates 21 and 31, and (B) a method of laminating a metal foil, such as copper, on the first and second substrates 21 and 31, forming a resist pattern on the metal foil, and etching the metal foil (see Japanese Unexamined Patent Publication No. 2008-32884 and the like). Further, the first and second lead-out wirings 23 and 33 may be formed of materials similar to the aforementioned first electrode 22 and second electrode 32 (indium tin oxide (ITO), conductive polymer, or the like). In a case where the first and second lead-out wirings 23 and 33 are formed of the same material as the first electrode 22 and the second electrode 32, the same method as the patterning method of the first electrode 22 and the second electrode 32, the forming method (B), a method of removing an unnecessary region by laser irradiation, or the like can be adopted.

The conductive particles in the forming method (A) can include fine particles having silver as a main component. Further, for example, fine particles having, as a main component, any one of gold, silver, copper, an alloy of gold and silver, an alloy of gold and copper, an alloy of silver and copper, and an alloy of gold, silver, and copper may be included. Moreover, fine particles having, as a main component, indium tin oxide (ITO), a conductive oxide in which zinc oxide is mixed in indium oxide (IZO [indium zinc oxide]), or a conductive oxide in which silicon oxide is mixed in indium oxide (ITSO) may be included.

Further, the method of forming the lead-out wirings 23 and 33 is not limited to the forming methods (A) and (B). A printing method, such as gravure printing other than the forming method (A), or photolithography other than the forming method (B) may be used.

The cover sheet 4 is a sheet member having a function of protecting a laminate of the first planar body 2 and the second planar body 3, and is formed in a rectangular shape in a plan view. In the plan view, the cover sheet 4 is laminated on an exposed surface of the second planar body 3, with an adhesive layer 7c therebetween, so as to cover the entire region of the respective superimposed planar bodies. For example, the cover sheet 4 is structured by a transparent sheet body formed of a glass plate such as soda glass, alkali-free glass, borosilicate glass, or quartz glass, polyethylene terephthalate (PET), polyimide (PI), polyethylene naphthalate (PEN), polyether sulfone (PES), polyether ether ketone (PEEK), polycarbonate (PC), polypropylene (PP), polyamide (PA), acryl, or the like. A thickness of the cover sheet 4 is not particularly limited, and is preferably about 0.1 mm to 50 mm. It is preferable that a thickness of the adhesive layer 7c disposed between the cover sheet 4 and the second planar body 3 be practically 500 μm or less. Further, the thickness of the adhesive layer 7c is preferably set to a sum of a thickness of a second connector portion 51b, to be described below, in the flexible wiring board 5 and a thickness of the second lead-out wiring 33 to which the second connector portion 51b is connected. Moreover, a general transparent adhesive such as an epoxy-based or acrylic adhesive can be used for the adhesive layer 7c, and an adhesive containing a core material formed of a transparent film of polyester-based resin may be used therefor. Further, the adhesive layer 7c may be formed by superimposing a plurality of sheet-like adhesives, and furthermore, may be formed by superimposing a plurality of kinds of sheet-like adhesives.

Figure 3:
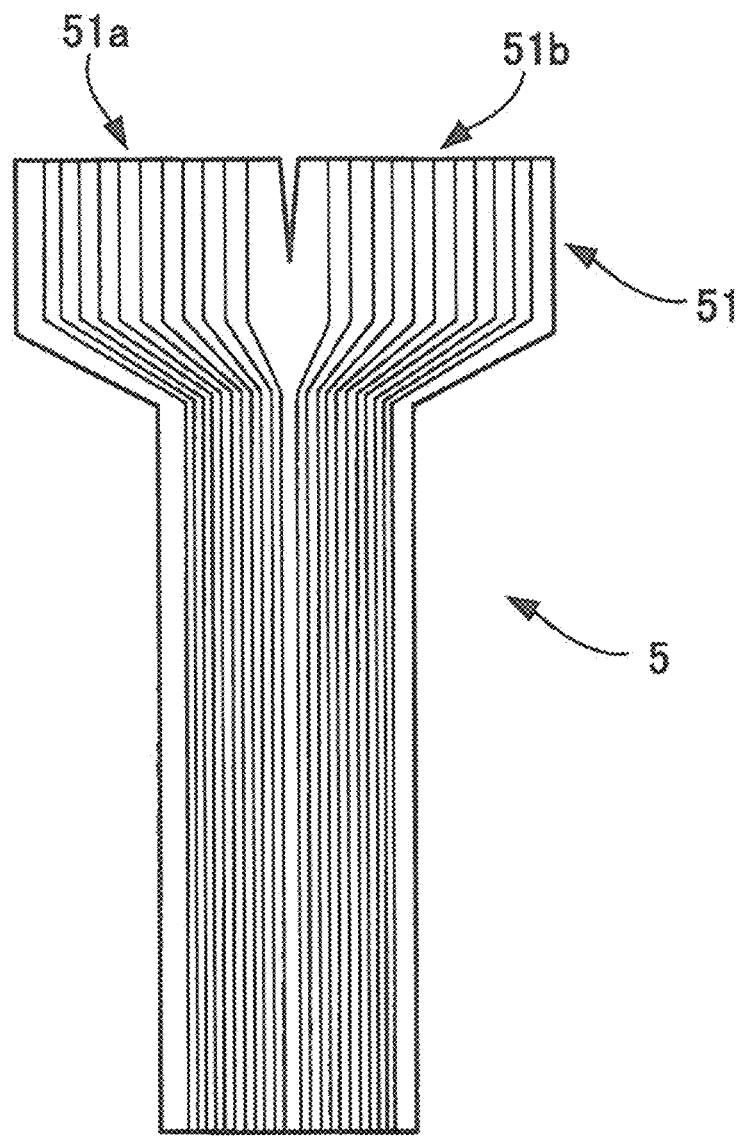
FIG. 3 is a plan view of a flexible wiring board included in the touch panel illustrated in FIG. 1.
Figure 4:
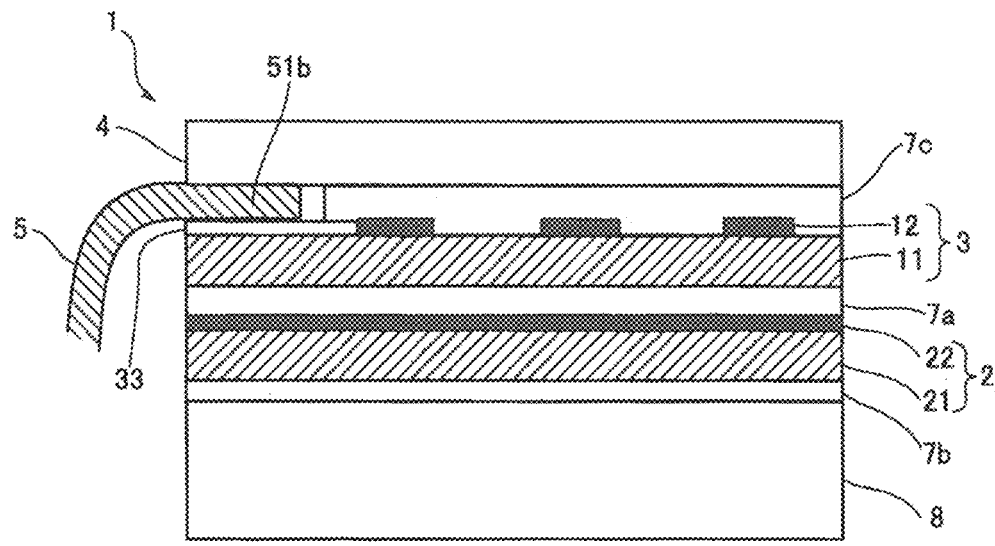
FIG. 4 is a sectional view of a schematic configuration of the touch panel according to the embodiment of the present invention.

The flexible wiring board 5 is a film-shaped, flexible, and freely bendable wiring board, and is disposed so as to be drawn outside from a side of the laminate formed of the first planar body 2, the second planar body 3, and the cover sheet 4. As illustrated in FIG. 3, the flexible wiring board 5 in the present embodiment includes a connector portion 51 having a shape in which a tip is branched into two. As illustrated in the sectional view of FIG. 1, one of the connector portion 51 constitutes a first connector portion 51a connected with the connection terminal of the first lead-out wiring 23 and, as illustrated in a sectional view of FIG. 4, the other of the connector portion 51 constitutes the second connector portion 51b connected with the connection terminal of the second lead-out wiring 33. The first connector portion 51a and the second connector portion 51b are configured so as to have substantially the same thickness. It should be noted that the connector portion 51 is connected to the connection terminals of the lead-out wirings by an anisotropic conductive adhesive, in which conductive particles are uniformly dispersed in the adhesive having high insulation.

Here, as illustrated in FIG. 1, the first connector portion 51a connected to the connection terminal of the first lead-out wiring 23 held by the first planar body 2 is disposed inside a gap portion 9 formed between the first substrate 21 of the first planar body 2 and the cover sheet 4 via the notch portion 31a formed at the second planar body 3. Inside the gap portion 9, the spacer member 6 that abuts with both the first connector portion 51a and the cover sheet 4 is disposed. A film body having a thickness which is approximately the same as a height of a gap formed between the first connector portion 51a and the cover sheet 4 (a distance between a surface of the first connector portion 51a and an inner surface of the cover sheet 4) is preferably used as the spacer member 6. The spacer member 6 structured by the film body is fixed onto the first connector portion 51a with an adhesive. Such a film body can be formed of polyethylene terephthalate (PET), polyimide (PI), polyethylene naphthalate (PEN), polyether sulfone (PES), polyether ether ketone (PEEK), polycarbonate (PC), polypropylene (PP), polyamide (PA), acryl, or the like. Instead of fixing the spacer member onto the first connector portion 51a, the spacer member may be fixed to a predetermined place of the cover sheet 4. Further, instead of such a film body, the spacer member 6 may be formed by arranging an ultraviolet curing resin on top of the first connector portion 51a, and thereafter, irradiating with ultraviolet rays and curing the ultraviolet curing resin.

Moreover, in the above configuration, the connector portion 51 of the flexible wiring board 5 is configured to have a shape branched into two, and the one is connected to the connection terminal of the first lead-out wiring 23 and the other is connected to the connection terminal of the second lead-out wiring 33. However, for example, two flexible wiring boards 5 are prepared, and each flexible wiring board 5 may be configured so as to be respectively connected to the connection terminal of the first lead-out wiring 23 and the connection terminal of the second lead-out wiring 33.

Next, a method of manufacturing the touch panel 1 having the above configuration will be described below. First, the first planar body 2, which has the first electrode 22 patterned on the one surface of the first substrate 21 and the first lead-out wiring 23 electrically connected to the first electrode 22, and the second planar body 3, which has the second electrode 32 patterned on the one surface of the second substrate 31 and the second lead-out wiring 33 electrically connected to the second electrode 32, are adhered with the adhesive layer 7a (a planar body adhering step) therebetween. At this time, the first planar body 2 and the second planar body 3 are adhered such that the predetermined region of the side edge of the first substrate 21, at which the one end portion of the first lead-out wiring 23 serving as the connection terminal is disposed, is exposed through the notch portion 31a formed at the second planar body 3.

Next, the first connector portion 51a of the flexible wiring board 5 is connected onto the connection terminal of the first lead-out wiring 23 held by the first planar body 2 (a flexible wiring board connecting step). Similarly, the second connector portion 51b of the flexible wiring board 5 is connected onto the connection terminal of the second lead-out wiring 33 held by the second planar body 3 (the flexible wiring board connecting step). The connection between the first connector portion 51a and the connection terminal of the first lead-out wiring 23 and the connection between the second connector portion 51b and the connection terminal of the second lead-out wiring 33 are preferably performed by, for example, thermocompression bonding.

Thereafter, the spacer member 6 is laminated and adhered on the upper side of the first connector portion 51a connected onto the connection terminal of the first lead-out wiring 23 (a spacer adhering step). At this time, the first connector portion 51a and the spacer member 6 are preferably adhered with, for example, an adhesive.

Next, the adhesive layer 7c is interposed on the exposed surface (the surface on which the second electrode 32 is formed, in FIGS. 1 and 4) of the second planar body 3. The cover sheet 4 is laminated and adhered on the upper side of the second planar body 3, the spacer member 6, and the second connector portion 51b (a cover sheet adhering step), thereby completing the touch panel 1.

Further, in the touch panel 1 having the above configuration, the method of detecting a touch position is similar to that of a conventional electrostatic capacitance-type touch switch. When a user touches an arbitrary position on the surface side of the touch panel 1 with a finger or the like, the first electrode 22 and the second electrode 32 are grounded at a touch position through electrostatic capacitance of a human body, and a coordinate of the touch position is calculated by detecting current values flowing through the first electrode 22 and the second electrode 32.

As mentioned above, the touch panel 1 according to the present embodiment is configured such that the spacer member 6 that abuts with both the first connector portion 51a of the flexible wiring board 5 and the cover sheet 4 is disposed at the gap formed between the first connector portion 51a and the cover sheet 4. Accordingly, even if the flexible wiring board 5 is bent, and a force that peels the first connector portion 51a from the connection terminal is generated at a connecting place between the first connector portion 51a of the flexible wiring board 5 and the connection terminal of the first lead-out wiring 23, the cover sheet 4 is capable of receiving this force through the spacer member 6. Consequently, the first connector portion 51a of the flexible wiring board 5 can be effectively prevented from being peeled from the connection terminal of the first lead-out wiring 23. As a result, it is possible to maintain a stable conduction state between the flexible wiring board 5 and the first lead-out wiring 23.

Here, the inventor prepared a touch panel with the spacer member 6 according to the present embodiment and a touch panel without the spacer member 6, and performed a test regarding environmental durability. Specifically, a test was performed which confirms whether or not a conduction state between a flexible wiring board 5 and a first lead-out wiring 23 in the touch panel provided under a hot and humid environment is successfully maintained over time.

Figure 5:
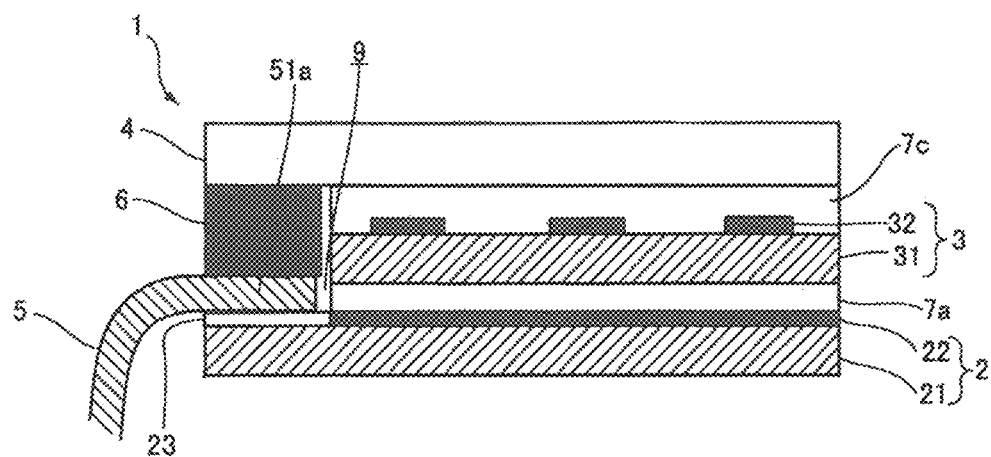
FIG. 5 is an explanatory view for describing a configuration of a touch panel used in a test conducted by an inventor.

The touch panel with the spacer member 6 used in the present test has a structure illustrated in FIG. 5, and was prepared such that a panel size is set to width 330 mm×255 mm. Further, a cover sheet 4 constituting the touch panel was formed of a glass material, and a first substrate 21 and a second substrate 31 were formed of polyethylene terephthalate (PET). Moreover, an acrylic adhesive was used as adhesive layers 7a and 7c. A thickness of the cover sheet 4 was set to 1.8 mm, both thicknesses of the first substrate 21 and the second substrate 31 were set to 125 μm, and both thicknesses of the adhesive layers 7a and 7c were set to 50 μm. Further, a connector portion with a thickness of 65 μm was used as a flexible wiring board 5, and the test was performed by bending this flexible wiring board 5 at 90 degrees. The spacer member 6 was formed of polyethylene terephthalate (PET) having a width of 2.5 mm (a length in the right and left direction in FIG. 5), a length of 36 mm, and a thickness of 125 μm (a length in the up and down direction in FIG. 5), and was adhered onto the flexible wiring board 5 with an acrylic adhesive (not illustrated). It should be noted that a thickness of the acrylic adhesive interposed between the spacer member 6 and the flexible wiring board 5 was 50 μm.

Moreover, the touch panel without the spacer member 6 was prepared so as to be identical to the above configuration except that it does not include the spacer member 6 and the acrylic adhesive interposed between the spacer member 6 and the flexible wiring board 5.

First, the touch panel with the spacer member 6 according to the present invention and the touch panel without the spacer member 6 were disposed under a hot and humid environment where temperature is 60° C. and humidity is 90%. In this case, after 120 hours had passed, in the touch panel without the spacer member 6, a first connector of the flexible wiring board 5 was peeled from the first lead-out wiring 23, and the conduction state between the first connector and the first lead-out wiring 23 was not maintained. On the other hand, in the touch panel with the spacer member 6 according to the present invention, even when the time had exceeded 960 hours, the good conduction state between the first connector and the first lead-out wiring 23 was maintained.

Further, a confirmation test was performed in cases where the touch panel with the spacer member 6 according to the present invention and the touch panel without the spacer member 6 were respectively disposed under a hot and humid environment where temperature is 70° C. and humidity is 90% and under a hot and humid environment where temperature is 85° C. and humidity is 90%. In both cases, in the touch panel 1 without the spacer member 6, after 120 hours had passed, the flexible wiring board 5 was peeled from the first lead-out wiring 23, and the conduction state was not maintained. On the other hand, in the touch panel 1 with the spacer member 6 according to the present invention, even when the time had exceeded 960 hours, the good conduction state was maintained.

From the above description, it is found that the touch panel 1 with the spacer member 6 according to the present invention is the touch panel 1 capable of maintaining the conduction state between the flexible wiring board 5 and the first lead-out wiring 23 in an extremely good state.

Although the embodiment of the touch panel 1 according to the present invention has been described above, the specific configuration is not limited to the above embodiment. For example, in the above embodiment, the width of the spacer member 6 is preferably formed larger than that of the first connector portion 51a of the flexible wiring board 5 in a plan view. For example, in a case where the first planar body 2, the second planar body 3, the cover sheet 4, and the like are formed of transparent materials, by forming the width of the spacer member 6 larger than that of the connector portion 51 of the flexible wiring board 5, it is possible to determine an outline of the spacer member 6 easily from the outside in the plan view. Accordingly, at the time of inspection work in a manufacturing stage of the touch panel 1, it is possible to easily confirm whether or not the spacer member 6 is disposed.

Further, in the above embodiment, the spacer member 6 is preferably disposed by being fixed to any one of cover sheet 4 and the first connector portion 51a of the flexible wiring board 5. The connector portion 51 of the flexible wiring board 5, the spacer member 6, the cover sheet 4, the first and second planar bodies 2 and 3, and the like slightly expand and contract repeatedly due to the influence of heat and humidity. However, by having the configuration in which the spacer member 6 and the cover sheet 4 are fixed to each other and the spacer member 6 and the first connector portion 51a are not fixed to each other, or the configuration in which the spacer member 6 and the first connector portion 51a are fixed to each other and the spacer member 6 and the cover sheet 4 are not fixed to each other, the influence of expansion and contraction of the cover sheet 4 exerted on the connecting place between the first connector portion 51a and the connection terminal of the first lead-out wiring 23 can be reduced, and the first connector portion 51a can be more effectively prevented from being peeled from the connection terminal of the first lead-out wiring 23.

DESCRIPTION OF REFERENCE SIGNS 1 touch panel
2 first planar body
21 first substrate
22 first electrode
23 first lead-out wiring
3 second planar body
31 second substrate
31a notch portion
32 second electrode
33 second lead-out wiring
4 cover sheet
5 flexible wiring board
51 connector portion
51a first connector portion
51b second connector portion
6 spacer member
7a, 7b, 7c adhesive layer
8 display device

The invention claimed is:

1. A touch panel comprising:
a first planar body having a first electrode patterned on one surface of a first substrate and a first lead-out wiring electrically connected to the first electrode;
a cover sheet provided on one surface side of the first planar body;
a second planar body provided between the first planar body and the cover sheet except a predetermined region of a side edge of the first substrate, the predetermined region in which one end portion of the first lead-out wiring serving as a connection terminal is disposed; and
a flexible wiring board interposed at a gap portion formed between the predetermined region of the side edge of the first substrate and the cover sheet, and drawn outside from a side of the first planar body and the cover sheet, wherein
the flexible wiring board includes a connector portion fixed onto the connection terminal of the first lead-out wiring held by the first planar body and electrically connected with the first lead-out wiring,
a spacer member that abuts with both the connector portion and the cover sheet is disposed between the connector portion and the cover sheet, and
the spacer member is disposed by being fixed to only one of the cover sheet and the connector portion.

2. The touch panel according to claim 1, wherein the spacer member is a film body disposed on the connector portion.

3. The touch panel according to claim 1, wherein the spacer member is formed of an ultraviolet curing resin.

4. The touch panel according to claim 1, wherein a width of the spacer member is formed larger than a width of the connector portion of the flexible wiring board in a plan view.

5. A method for manufacturing a touch panel comprising:
a planar body adhering step of adhering a first planar body, which has a first electrode patterned on one surface of a first substrate and a first lead-out wiring electrically connected to the first electrode, and a second planar body with an adhesive layer therebetween, in a state of exposing a predetermined region of a side edge of the first substrate, the predetermined region in which one end portion of the first lead-out wiring serving as a connection terminal is disposed;

a flexible wiring board connecting step of connecting a connector portion of a flexible wiring board onto the connection terminal of the first lead-out wiring held by the first planar body;

a spacer adhering step of laminating and adhering a spacer member on an upper side of the connector portion connected onto the connection terminal of the first lead-out wiring; and a cover sheet adhering step of laminating and adhering a cover sheet on an upper side of the second planar body and the spacer member, after interposing an adhesive layer on an exposed surface of the second planar body such that the spacer member is not fixed to the cover sheet.

6. A method for manufacturing a touch panel comprising:

a planar body adhering step of adhering a first planar body, which has a first electrode patterned on one surface of a first substrate and a first lead-out wiring electrically connected to the first electrode, and a second planar body with an adhesive layer therebetween, in a state of exposing a predetermined region of a side edge of the first substrate, the predetermined region in which one end portion of the first lead-out wiring serving as a connection terminal is disposed;

a flexible wiring board connecting step of connecting a connector portion of a flexible wiring board onto the connection terminal of the first lead-out wiring held by the first planar body;

a spacer laminating step of laminating a spacer member on an upper side of the connector portion connected onto the connection terminal of the first lead-out wiring such that the spacer member is not fixed to the connector portion; and a cover sheet adhering step of laminating and adhering a cover sheet on an upper side of the second planar body and the spacer member, after interposing an adhesive layer on an exposed surface of the second planar body such that the spacer member is fixed to the cover sheet.

* * * * *